United States Patent
Tanisaki (10) Patent No.: US 9,160,876 B2
(45) Date of Patent: Oct. 13, 2015

(54) ELECTRONIC DEVICE WITH PYROELECTRIC INFRARED SENSOR FOR DETECTING OBJECT

(71) Applicant: KYOCERA Document Solutions Inc., Osaka (JP)

(72) Inventor: Yukio Tanisaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/041,990

(22) Filed: Sep. 30, 2013

(65) Prior Publication Data

US 2014/0098394 A1    Apr. 10, 2014

(30) Foreign Application Priority Data

Oct. 5, 2012  (JP) ................. 2012-223692

(51) Int. Cl.
| | |
|---|---|
| G06F 3/12 | (2006.01) |
| H04N 1/00 | (2006.01) |
| G01J 5/00 | (2006.01) |
| G01J 5/04 | (2006.01) |
| G01J 5/02 | (2006.01) |
| G01J 5/34 | (2006.01) |
| G01J 5/08 | (2006.01) |
| G06K 15/00 | (2006.01) |
| G06F 1/32 | (2006.01) |

(52) U.S. Cl.
CPC .......... *H04N 1/00896* (2013.01); *G01J 5/0022* (2013.01); *G01J 5/025* (2013.01); *G01J 5/047* (2013.01); *G01J 5/0806* (2013.01); *G01J 5/089* (2013.01); *G01J 5/34* (2013.01); *H04N 1/00323* (2013.01); *G01J 2005/0029* (2013.01); *G06F 1/3231* (2013.01); *G06K 15/4055* (2013.01); *H04N 1/00885* (2013.01); *H04N 2201/0094* (2013.01); *Y02B 60/1267* (2013.01)

(58) Field of Classification Search
USPC .................................................. 350/348, 347
See application file for complete search history.

(56) References Cited

U.S. PATENT DOCUMENTS

| | | | | |
|---|---|---|---|---|
| 4,612,442 | A * | 9/1986 | Toshimichi | 250/353 |
| 5,528,038 | A * | 6/1996 | Yoshiike et al. | 250/342 |
| 5,826,980 | A * | 10/1998 | Kouzu et al. | 374/124 |
| 6,970,183 | B1 * | 11/2005 | Monroe | 348/143 |
| 8,382,093 | B2 * | 2/2013 | Dan | 271/10.03 |

(Continued)

FOREIGN PATENT DOCUMENTS

JP    2008-064935 A    3/2008

*Primary Examiner* — Miya J Cato (74) *Attorney, Agent, or Firm* — Knobbe, Martens, Olson & Bear LLP (57) ABSTRACT

An image forming apparatus includes: a sensor section, an oscillation mechanism, a control section, and an object determination section. The sensor section has a pyroelectric infrared sensor detecting presence of an object based on an infrared ray change. The oscillation mechanism turns the sensor section. The control section, upon the detection of the object by the sensor section, makes the oscillation mechanism start the turning operation. The object determination section, after the turning operation of the sensor section starts from a predefined initial position, determines that the object exists in a case where a state in which the object is detected by the sensor section continues for a predefined first period of time, and determines that the object does not exist in a case where the state in which the object is detected does not continue for the first period of time.

1 Claim, 9 Drawing Sheets

(56) References Cited

U.S. PATENT DOCUMENTS

| | | |
|---|---|---|
| 2007/0133843 A1* | 6/2007 | Nakatani ................ 382/115 |
| 2012/0127538 A1* | 5/2012 | Mamiya et al. ............ 358/442 |
| 2012/0241625 A1* | 9/2012 | Masumoto et al. .......... 250/348 |
| 2012/0327458 A1* | 12/2012 | Baba et al. ................ 358/1.15 |
| 2014/0002844 A1* | 1/2014 | Miyamoto et al. .......... 358/1.13 |
| 2014/0092414 A1* | 4/2014 | Tezuka et al. ............. 358/1.13 |

* cited by examiner

ELECTRONIC DEVICE WITH PYROELECTRIC INFRARED SENSOR FOR DETECTING OBJECT

INCORPORATION BY REFERENCE

This application claims priority to Japanese Patent Application No. 2012-223692 filed on 5, Oct. 2012, the entire contents of which are incorporated by reference herein.

BACKGROUND

This disclosure relates to an electronic device and an image forming apparatus, and more specifically to a technology of detecting an object by a pyroelectric infrared sensor.

An electronic device loaded with a human body detecting sensor is suggested. As such an electronic device, there is, for example, an image forming apparatus which, by starting heating of a fixing section after human body detection by the human body detecting sensor, can heat the fixing section by use of time from the human body detection to approach of an operator to an operation section to thereby set a standby fixing temperature lower than that of a device not loaded with a human body detecting sensor. Moreover, when the human body detecting sensor does not detect a human body, the image forming apparatus can be shifted from a normal mode in which immediate image formation is possible to a sleep mode in a power-saving state to thereby stop driving of a heater heating the fixing section at the right time and then reduce power.

SUMMARY

As one aspect of this disclosure, a technology obtained by further improving the aforementioned conventional technology is suggested.

An electronic device according to one aspect of this disclosure includes: a sensor section, an oscillation mechanism, a control section, and an object determination section.

The sensor section has a pyroelectric infrared sensor detecting presence of an object based on an infrared ray change.

The oscillation mechanism turns the sensor section in a predefined direction.

The control section, upon the detection of the object by the sensor section, makes the oscillation mechanism start the turning operation.

The object determination section, after the turning operation of the sensor section starts from a predefined initial position at which a view angle of the sensor section is directed ahead of front of the electronic device, determines that the object exists in a case where a state in which the object is detected by the sensor section continues for a predefined first period of time, and determines that the object does not exist in a case where the state in which the object is detected does not continue for the first period of time.

DETAILED DESCRIPTION

Figure 1:
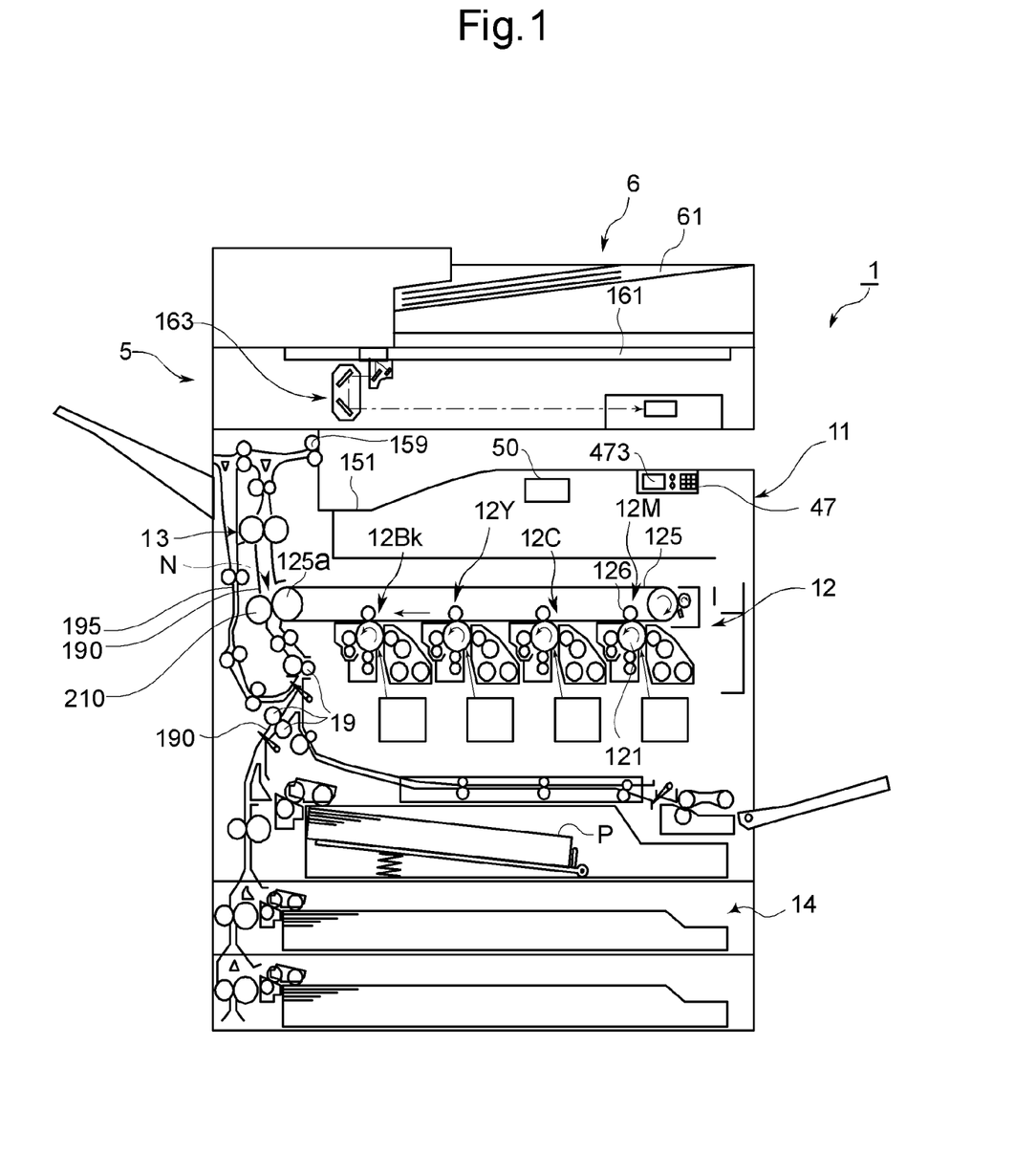
FIG. 1 is an elevation view in section showing structure of an image forming apparatus as an electronic device according to one embodiment of this disclosure.

Hereinafter, an electronic device according to one embodiment as one aspect of this disclosure will be described with reference to the drawings. FIG. 1 is an elevation view in section showing structure of an image forming apparatus as the electronic device according to one embodiment of this disclosure.

The image forming apparatus 1 according to one embodiment of this disclosure is a compound machine combining a plurality of functions including: for example, a copy function, a printer function, a scanner function, and a facsimile function. The image forming apparatus 1 includes in an apparatus main body 11: an operation section 47, an image formation section 12, a fixing section 13, a paper feed section 14, a document feed section 6, a document reading section 5, etc.

The operation section 47 receives, from an operator, instructions such as an image formation operation execution instruction and a document reading operation execution instruction for various operations and processing executable by the image forming apparatus 1.

To perform the document reading operation by the image forming apparatus 1, the document reading section 5 optically reads an image of a document fed by the document feed section 6 or a document loaded on document loading glass 161 to generate image data. The image data generated by the document reading section 5 is saved into, for example, a built-in HDD or a network-connected computer.

To perform the image formation operation by the image forming apparatus 1, based on, for example, the image data generated through the aforementioned document reading operation, the image data received from the network-connected computer, or the image data stored in the built-in HDD, the image formation section 12 forms a toner image on recording paper P as a recording medium fed from the paper feed section 14. To perform color printing, a magenta image formation unit 12M, a cyan image formation unit 12C, an yellow image formation unit 12Y, and a black image formation unit 12Bk of the image formation section 12, based on an image formed of respective color components composing the aforementioned image data, respectively form toner images on a photoconductor drum 121 through charging, exposure, and developing processes, and transfer these toner images onto an intermediate transfer belt 125 by a primary transfer roller 126.

The aforementioned toner images of the respective colors transferred onto the intermediate transfer belt 125 are superposed on one another on the intermediate transfer belt 125 while transfer timing is adjusted, thereby forming a color toner image. A secondary transfer roller 210, at a nip part N which it forms with a driving roller 125a with the intermediate transfer belt 125 in between, transfers this color toner image formed on a surface of the intermediate transfer belt 125 onto the recording paper P conveyed through a conveyance path 190 from the paper feed section 14. Then the fixing section 13 fixes the toner image on the recording paper P onto the recording paper P through thermo compression bonding. The recording paper P with the color image already formed thereon and already subjected to the fixing processing is discharged to a discharge tray 151.

In the image forming apparatus 1, to perform duplex printing, after the recording paper P on one side of which the image is formed by the image formation section 12 is nipped by a discharge roller pair 159, this recording paper P is switched back by the discharge roller pair 159 and fed to an inverted conveyance path 195, and is conveyed again by a conveying roller pair 19 to an upstream area in a conveyance direction of the recording paper P with respect to the aforementioned nip part N and the fixing section 13. As a result, an image is formed on the other surface of the recording paper by the image formation section 12.

Set at an appropriate place on a front surface of the image forming apparatus 1, preferably a horizontally central position on the front surface of the image forming apparatus 1 at a height of 50 to 70 cm from a floor on which the image forming apparatus 1 is installed is a sensor section 50 having a pyroelectric infrared sensor for detecting an operator of this image forming apparatus 1 as an object.

Figure 2:
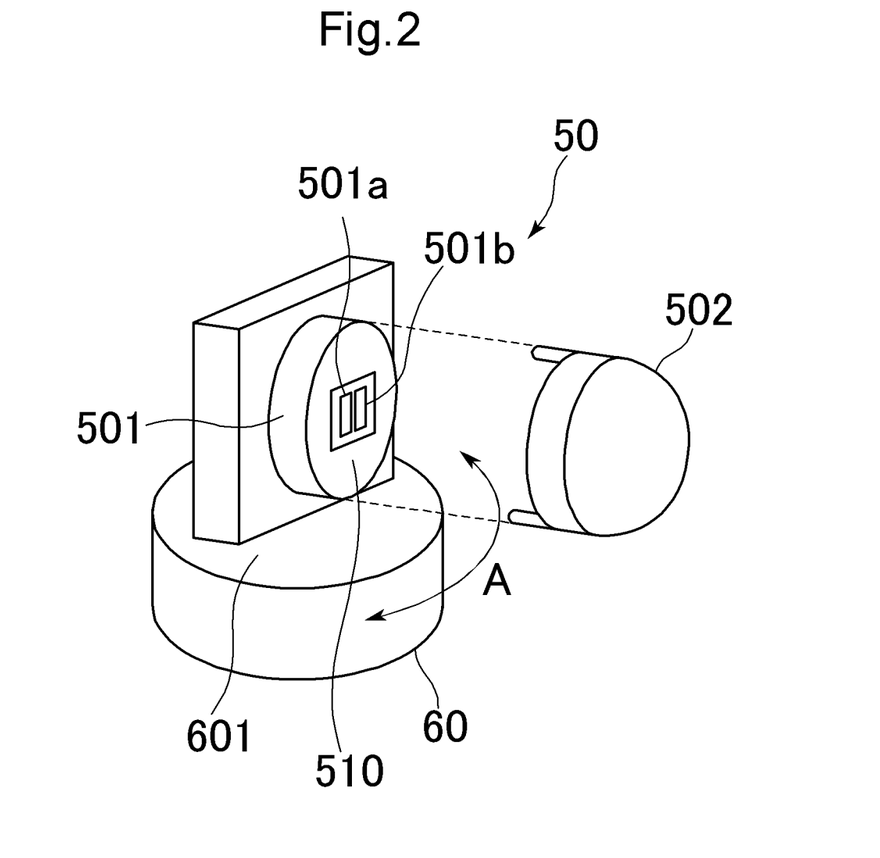
FIG. 2 is a schematic diagram showing main portions of a sensor section and an oscillation mechanism according to one embodiment of this disclosure.

FIG. 2 is a schematic diagram showing main portions of the sensor section 50 and an oscillation mechanism 60. The sensor section 50 includes a pyroelectric infrared sensor 501 and a lens 502.

The pyroelectric infrared sensor 501 includes pyroelectric elements having electrodes on a substrate surface provided with pyroelectric effect, and uses the pyroelectric element to detect an object (human or physical body) in a predefined detection region. The pyroelectric infrared sensor 501 includes: a pyroelectric substrate formed of, for example, a ferrodielectric; and the pyroelectric elements having the electrodes provided oppositely on both surfaces of the pyroelectric substrate. The pyroelectric infrared sensor 501 condenses, onto a light reception section of the pyroelectric element, infrared rays generated by human body movement, converts into a voltage signal a signal provided by polarization of the pyroelectric element caused according to an infrared ray change, and in a case where this voltage signal subjected to predetermined processing is at a high level or a low level as a result of comparison with a threshold value by a comparator, determines that the object has been detected and outputs a signal indicating this high level or low level. The pyroelectric infrared sensor 501 in this embodiment includes a dual element having the aforementioned two pyroelectric elements 501a and 501b arranged in an array. Each of the pyroelectric elements 501a and 501b is horizontally arrayed, and regions of light reception by the pyroelectric elements 501a and 501b are different in a horizontal direction. Upon detection of an object by either of the pyroelectric elements 501a and 501b, it is assumed that the sensor section 50 has detected the object. The electrodes on a light receiving surface or the electrodes on an opposing surface of each of the pyroelectric elements 501a and 501b are serially connected together in a manner such that electric charges generated as a result of a temperature change of the pyroelectric substrate are reversed, and accuracy in object detection is improved more than that in a case where only one pyroelectric element is used.

The lens 502 is, for example, a Fresnel lens, which widens a view angle of the pyroelectric infrared sensor 501, and which also condenses infrared rays generated in respective predefined ranges of the detection regions and irradiates them to each of the aforementioned pyroelectric elements of the pyroelectric infrared sensor 501. The horizontal view angle in particular, in order to permit detection of a human body approaching the image forming apparatus 1 from side to side, is set at, for example, 110 degrees in total, 55 degrees in the horizontal direction for the pyroelectric elements 501a and 501b, respectively, with respect to a sensor surface 510 of the pyroelectric infrared sensor 501.

Moreover, to the sensor section 50, the oscillation mechanism 60 is fitted. The oscillation mechanism 60 is an oscillation mechanism which turns the sensor section 50 in a predefined direction. Even when the operator serving as the object of the sensor section 50 remains still at a position ahead of the image forming apparatus 1, which is within the region of the detection by the sensor section 50, the oscillation mechanism 60 pivots the pyroelectric infrared sensor in order to permit detection of the presence of this operator by the sensor section 50.

The oscillation mechanism 60 supports a bottom part of the sensor section 50 and is formed into, for example, a disc-like shape. The oscillation mechanism 60, where a circle center of a top surface section 601 of a circle shape is a rotation axis, performs pivot operation around this rotation axis in a horizontal direction indicated by an arrow A in FIG. 2 from an initial position through predefined angles, respectively in both directions. The oscillation mechanism 60 includes, for example, a stepping motor, which serves as a driving source of the pivot operation of the oscillation mechanism 60. The oscillation mechanism 60 has therebelow a rotation axis, not shown, at a rotation center, and rotates around this rotation axis by rotation driving force supplied from the stepping motor. Under rotation amount control of the stepping motor by a control section 100 (FIG. 3), the pivot operation and operation at a pivot angle of the oscillation mechanism 60 are controlled.

The sensor section 50 is fixed at the rotation axis (not shown) at a top surface part of the oscillation mechanism 60, and as a result of horizontal pivot operation of the oscillation mechanism 60, the sensor section 50 also performs oscillation operation together with the oscillation mechanism 60. Moreover, an angle of the oscillation operation is defined as an angle which covers a predefined region where the object detection is performed by the pyroelectric infrared sensor 501 in a region ahead of the image forming apparatus 1.

Note that a direction of the oscillation of the sensor section 50 by the oscillation mechanism 60 caused by the stepping motor may be either a direction from right to left (horizontal direction) or a direction from top to bottom (vertical direction) of the image forming apparatus 1. Further, the oscillation direction of the sensor section 50 may also be a diagonal direction. Note that, however, in these cases, the pyroelectric elements 501a and 501b of the pyroelectric infrared sensor 501 are provided in parallel to this oscillation direction, and the rotation axis receiving the supply of the rotation driving force from the aforementioned stepping motor extends in a direction orthogonal to this oscillation direction. A cycle of the oscillation operation may be in any degree that permits the human body detection by the pyroelectric infrared sensor 501, and more specifically may be several seconds.

Figure 3:
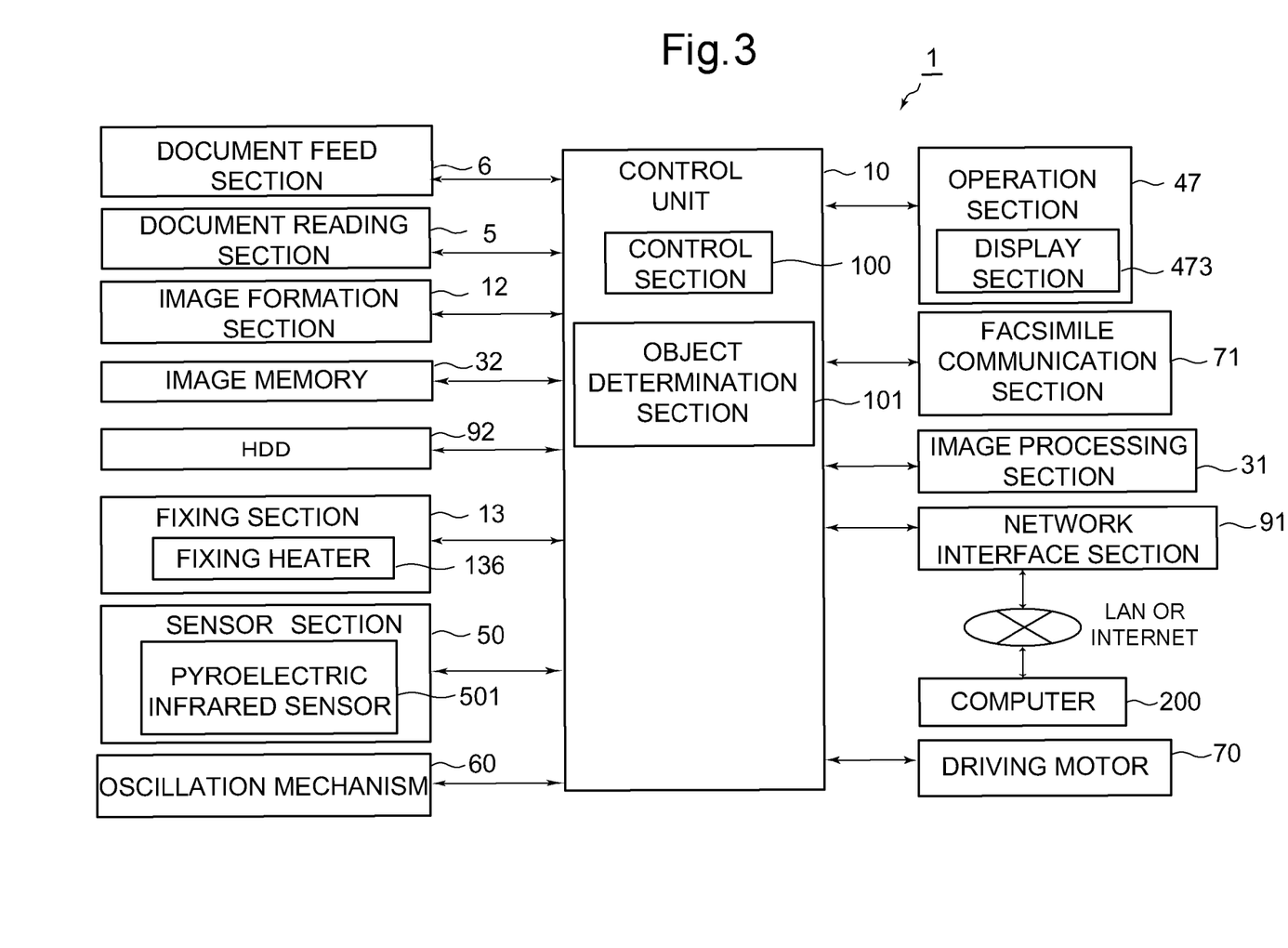
FIG. 3 is a functional block diagram showing main internal configuration of the image forming apparatus according to one embodiment of this disclosure.

Next, configuration of the image forming apparatus 1 will be described. FIG. 3 is a functional block diagram showing main internal configuration of the image forming apparatus 1.

The image forming apparatus 1 includes a control unit 10. The control unit 10 is composed of a CPU (Central Processing Unit), a RAM, a ROM, a dedicated hardware circuit, etc., and plays a role in overall operation control of the image forming apparatus 1.

The document reading section 5 includes a reading mechanism 163 having a light irradiation section, a CCD sensor, etc. under the control by the control unit 10. The document reading section 5 irradiates a document by the light irradiation section, and receives its reflection light with the CCD sensor to thereby read an image from the document.

An image processing section 31 performs, when needed, image processing on the image data of the image read at the document reading section 5. For example, the image processing section 31, in order to improve quality of the image read by the document reading section 5 and then already subjected to image formation by the image formation section 12, performs predefined image processing such as shading correction.

An image memory 32 is a region which temporarily stores data of a document image obtained through the reading by the document reading section 5 and which temporarily saves data serving as a printed object of the image formation section 12.

The image formation section 12 performs image formation for, for example, print data read at the document reading section 5 and print data received from the network-connected computer 200.

The operation section 47 receives from the operator the instructions for the various operations and processing executable by the image forming apparatus 1. The operation section 47 includes a display section 473.

A facsimile communication section 71 includes a coding/decoding part, a modulation and demodulation part, and an NCU (Network Control Unit), not shown, and performs facsimile transmission by use of a public phone line network.

A network interface section 91 is formed of a communication module such as a LAN board, and performs transmission and reception of various pieces of data to and from, for example, the computer 200 in a local area via, for example, a LAN connected to this network interface section 91.

An HDD 92 is a high-capacity storage device that stores, for example, a document image read by the document reading section 5.

The sensor section 50 has the pyroelectric infrared sensor 501 that detects the presence of an object based on an infrared ray change, and notifies the control section 100 that the object has been detected or has not been detected.

The oscillation mechanism 60, under the control by the control section 100, makes the sensor section 50 perform oscillation operation. The control section 100, within a predefined angle range, makes the sensor section 50 perform reciprocating turning by the oscillation mechanism 60.

The fixing section 13 fixes the image formed at the image formation section 12 onto recording paper through heat or pressure application.

A driving motor 70 is a driving source that gives rotational driving force to, for example, each rotation member conveying roller pair 19 of the image formation section 12.

The control unit 10 includes: the control section 100, and an object determination section 101.

The control section 100 is connected to the document reading section 5, the document feed section 6, the image processing section 31, the image memory 32, the image formation section 12, the operation section 47, the facsimile communication section 71, the network interface section 91, the HDD (hard disc drive) 92, the sensor section 50, the oscillation mechanism 60, the fixing section 13, etc., and performs driving control of these parts.

The object determination section 101, after start of the turning operation of the sensor section 50 by the control section 100, in a case where a state in which the object is detected by the sensor section 50 continues for a predefined first period of time, determines that this object exists and this object is the operator. The object determination section 101, in a case where the state in which this object is detected does not continue for the first period of time, determines that the object does not exist and this object is a passenger. The predefined first period of time is, for example, a period of time at which, in a case where the sensor section 50 at a turning center position is turned by the turning operation by the oscillation mechanism 60 from this turning center position to a limited spot of the turning operation in a direction towards one side or a direction towards the other side, the object located in a still state ahead of the front of the turning center position is assumed to be continuously detected. It is preset at the object determination section 101 by, for example, a manufacturer of the image forming apparatus 1. Note that this turning center position refers to a position at which a center of the view angle of the sensor section 50 is directed ahead of the front of the image forming apparatus 1, i.e., an initial position for the turning operation of the sensor section 50 (to be described later).

Moreover, in a case where the state in which the object is detected by the sensor section 50 continues for a predefined second period of time that is longer than the first period of time, the object determination section 101 determines that this object does not exist. The predefined second period of time may be any period of time that is longer than the first period of time.

Moreover, the control section 100 can selectively set a normal operation mode providing a state in which the image forming apparatus 1 can perform normal operation or a sleep mode providing a state in which the image forming apparatus 1 is power-saving. The control section 100 sets the image forming apparatus 1 in the sleep mode when the object determination section 101 determines that an object does not exist and it is a passenger, and sets the image forming apparatus 1 in the normal operation mode when the object determination section 101 determines that an object exists and it is the operator.

Moreover, the control section 100, upon the detection by the object determination section 101 that the object exists and this object is the operator, drives a heater 136 in the fixing section 13, and upon the determination by the object determination section 101 that an object does not exist and this object is a passenger, stops the driving of the heater 136.

Figure 4A:
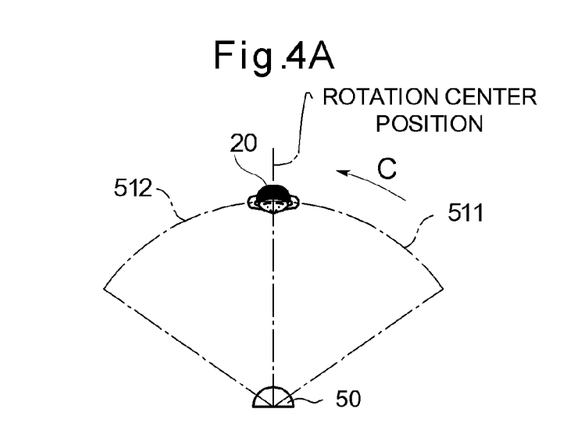
FIGS. 4A to 4D are diagrams showing how the sensor section detects an object (operator) remaining still ahead of front of the image forming apparatus according to one embodiment of this disclosure.

Next, an example of the determination by the object determination section 101 will be described. FIGS. 4A to 4D are diagrams showing how an object (operator) remaining still ahead of the front of the image forming apparatus 1 is detected by the sensor section 50. FIG. 4A shows a situation when, in a state in which the sensor section 50 is oriented ahead of the front and is at the turning center position (the default initial position for the turning operation of the sensor section 50), the object 20 remains still within the detection region of the pyroelectric infrared sensor 501 in front of the apparatus and the sensor section 50 detects this object 20.

As described above, in case of the pyroelectric infrared sensor 501 of a dual type, the sensor section 50 has two (right and left) detection regions (first detection region 511 and second detection region 512). Here, the turning center position of the sensor section 50 is defined as a position at which a center of a region permitting object detection at time of the turning of the sensor section 50 is in a direction orthogonal to a front side part of the image forming apparatus 1. The first detection region 511 and the second detection region 512, as shown in FIG. 4A, are set in regions on a front side of the image forming apparatus 1 and angled at 55-degree angles, respectively, 110-degree angle in total from a state in which the sensor section 50 is, for example, at this turning center position. Upon entrance of the infrared-ray-emitting object 20 into either of the first detection region 511 and the second detection region 512, the sensor section 50 detects this object 20.

Figure 4B:
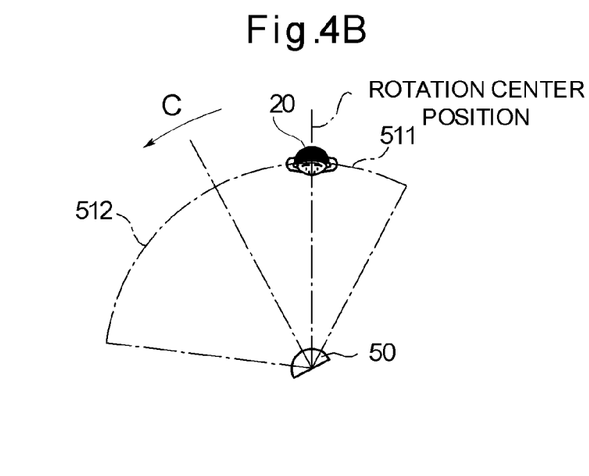

FIG. 4B shows a situation when the sensor section 50 rotates in an arrow direction shown in FIG. 4A, that is, leftward in FIG. 4A from the turning center position. When the sensor section 50 turns leftward from the state of FIG. 4A and turns into, for example, a state shown in FIG. 4B, a relative position of the object 20 in the detection regions (the first detection region 511 and the second detection region 512) of the sensor section 50 is changed but this object 20 remains within the detection region of the sensor section 50, and therefore a state in which the object 20 is detected by the sensor section 50 continues.

Figure 4C:
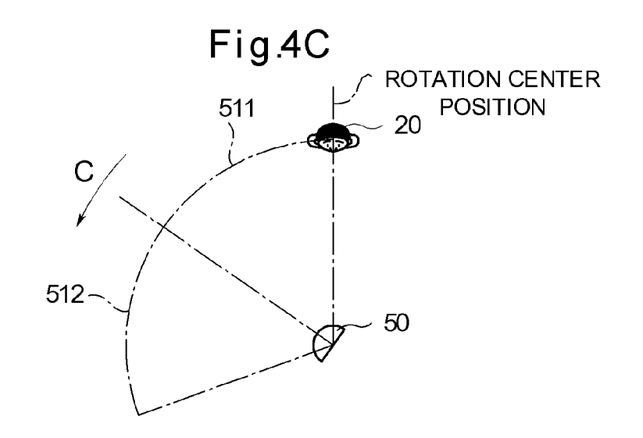

FIG. 4C shows a situation when the sensor section 50 further rotates in an arrow direction shown in FIG. 4B, that is, leftward in FIG. 4B from the turning center position. Upon the further leftward turning of the sensor section 50 from the state of FIG. 4B, the relative position of the object 20 within the detection regions of the sensor section 50 is changed to a position located closely to a right end part of the first detection region 511, but while this object 20 remains within the detection region of the sensor section 50, the state in which the object 20 is detected by the sensor section 50 continues.

Figure 4D:
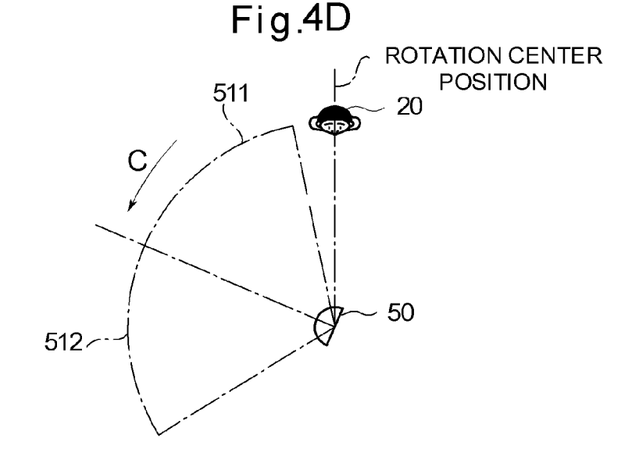

FIG. 4D shows a situation when the sensor section 50 further rotates in an arrow direction shown in FIG. 4C, that is, leftward in FIG. 4C from the turning center position. Upon the further leftward turning of the sensor section 50 from a state of FIG. 4C, there arises a state in which the object 20 is out of the detection regions of the sensor section 50. At this point in time, the sensor section 50 no longer detects this object 20.

Specifically, in a case where the sensor section 50 facing the turning center position detects the object 20 in front of the apparatus and the sensor section 50 turns leftward, during a period from the state shown in FIG. 4A until the state shown in FIG. 4C, the state in which the object 20 is detected by the sensor section 50 continues, and until a state shown in FIG. 4D is reached as a result of the turning of the sensor section 50, the state in which the sensor section 50 detects the object 20 continues. Then upon the reach of the state shown in FIG. 4D, the state in which the sensor section 50 detects the object 20 ends, turning into a state in which the sensor section 50 does not detect the object 20.

The predefined first period of time is defined as a period of time for which, when the sensor section 50 turns from the turning center position as shown in FIGS. 4A to 4D, the sensor section 50 is assumed to continuously detect the object 20 in this still state. Here, the predefined first period of time is set based on the object 20 remaining still at the turning center position which is ahead of the front of the image forming apparatus 1, but can also be defined as a period of time for which the sensor section 50 is assumed to continuously detect the object 20 remaining still on a right or left side of the turning center position in FIGS. 4A to 4D or at a different position in an anterior-posterior position with respect to the sensor section 50.

Figure 5A:
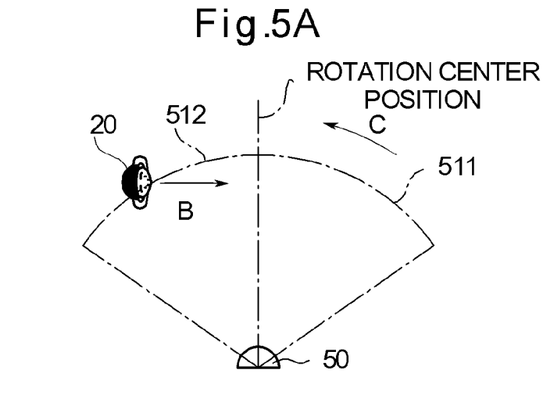
FIGS. 5A to 5D are diagrams showing how the sensor section detects an object moving ahead of the image forming apparatus according to one embodiment of this disclosure.

FIGS. 5A to 5D are diagrams showing how the sensor section 50 detects the object 20 moving ahead of the image forming apparatus 1. FIG. 5A shows how, in a state in which the sensor section 50 faces the front (a state in which it is at the turning center position), the object 20 enters into the detection region of the sensor section 50 from the left with respect to the image forming apparatus 1 and moves rightward and the sensor section 50 detects this object 20.

Figure 5B:
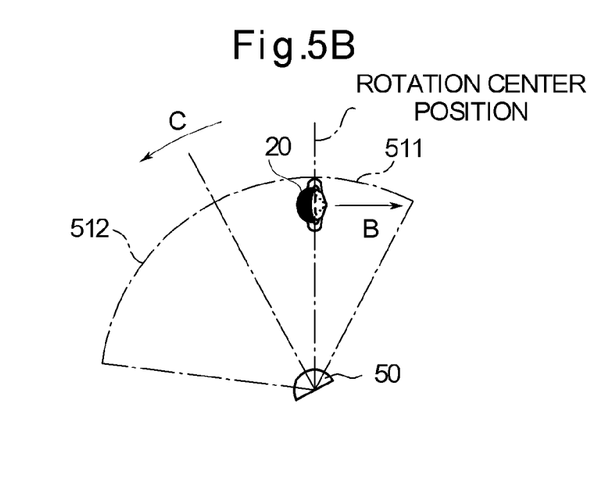
Figure 5C:
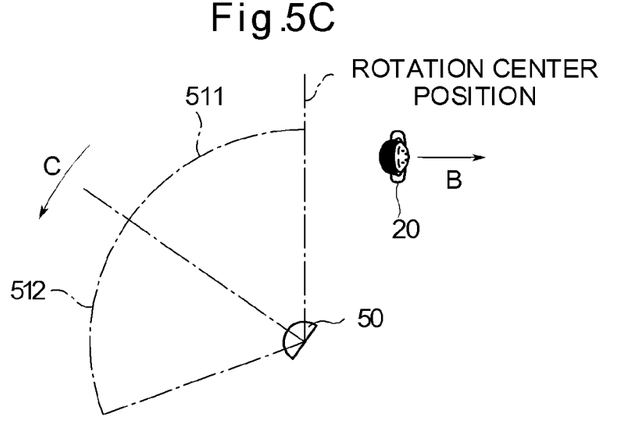
Figure 5D:
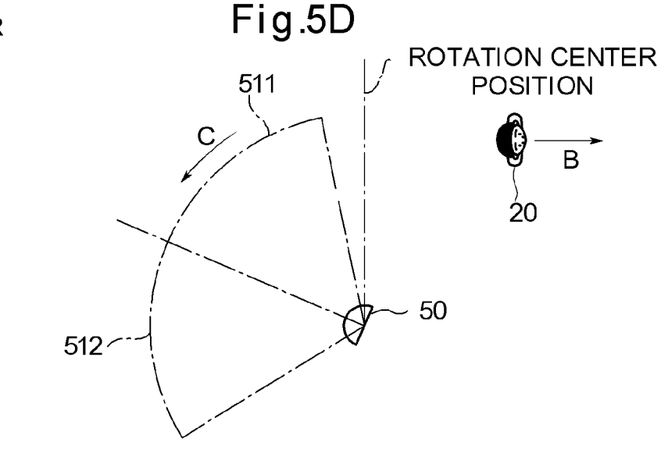

FIGS. 5B, 5C, and 5D are diagrams showing positional relationship between the detection regions of the sensor section 50 and the object 20 when the sensor section 50 is turned by the oscillation mechanism 60 in a direction (direction indicated by an arrow C) opposite to a travel direction of the object 20 shown by an arrow B.

When the object 20 and the detection regions of the sensor section 50 are in a state of FIG. 5A, upon entrance of the object 20 into the detection region of the sensor section 50 from a left direction of FIG. 5A and its continuous rightward movement, the sensor section 50 detects this object 20.

Upon continuous movement of this object 20 in the aforementioned direction from the left to the right (the direction of the arrow B) and turning of the sensor section 50 in a direction opposite (the direction of the arrow C) to the moving direction of the object 20 by the oscillation mechanism 60 under the control by the control section 100, the object 20 moves to a position out of the detection regions of the sensor section 50 with higher possibility than the object 20 remaining still at the position ahead of the front of the image forming apparatus 1.

As shown as an example in FIG. 5B, when the sensor section 50 turns in the direction (the direction of the arrow C) opposite to the moving direction of the object 20 to the same position as a position shown in FIG. 4B described above, even if a state in which the object 20 remains within the detection region of the sensor section 50 continues, upon further continuous movement of the object 20 in the aforementioned direction, further turning of the sensor section 50 in the direction opposite to the moving direction of the object 20, and turning of the sensor section 50 to the same position as a position shown in FIG. 4C described above, the object 20 moves to the position shown as an example in FIG. 5C, that is, the position out of the detection regions of the sensor section 50 with higher possibility than the object 20 remaining still at the position ahead of the front of the image forming apparatus 1. This is because, compared to the object 20 remaining still, the object 20 moving in the aforementioned direction, with respect to the sensor section 50 turning in the direction (that is, a direction directed towards the object 20) opposite to the moving direction of the object 20, has a higher relative speed at which it moves in the aforementioned direction within the detection regions of the sensor section 50.

Note that, even if the sensor section 50 further turns leftward thereafter, the object 20 moves rightward, which is the direction of the arrow B, and thus the state in which the object 20 is out of the detection regions of the sensor section 50 continues, as shown as an example in FIG. 5D.

Thus, for the object 20 moving as described above, a period from when it is detected by the sensor section 50 until when this object 20 moves out of the detection regions of the sensor section 50 turning in the direction opposite to the moving direction of this object 20 is assumed to be shorter than that for the object 20 remaining still at the aforementioned position ahead of the front of the image forming apparatus 1.

As a result, after start of the turning operation of the sensor section 50 by the control section 100, in a case where the state in which the object 20 is detected by the sensor section 50 continues for the aforementioned first period of time, the object determination section 101 determines that this object 20 exists, and in a case where the state in which this object 20 is detected does not continue for this first period of time, the object determination section 101 determines that the object 20 does not exist, whereby an object which is the object 20 in motion and which may be just a passenger with high possibility is excluded and the presence of the object 20 which remains still ahead of the front of the image forming apparatus 1 and which may be the operator of the image forming apparatus 1 with high possibility is accurately detected.

Figure 6:
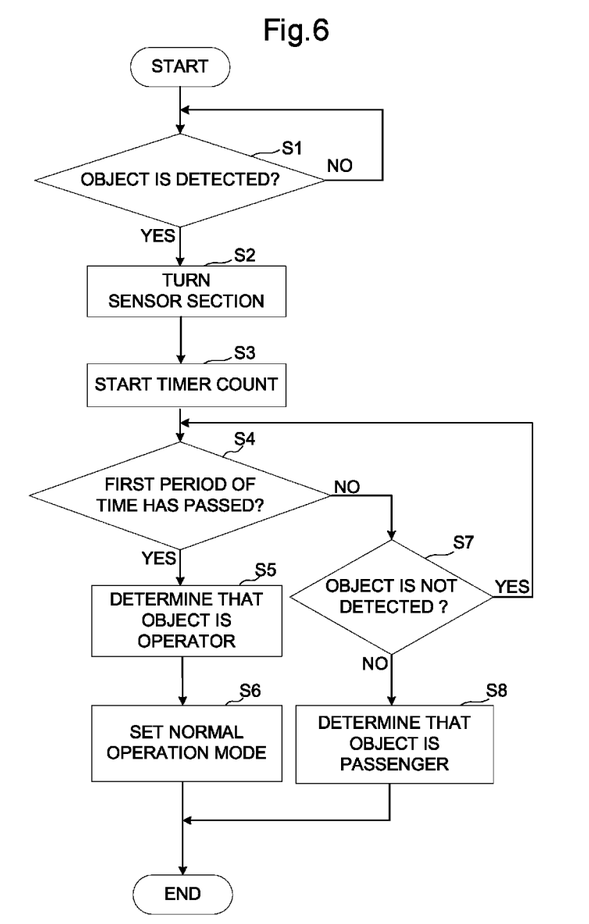
FIG. 6 is a flow chart showing a first embodiment of operator determination and operation mode switching processing performed by the image forming apparatus according to one embodiment of this disclosure.

Next, a first embodiment of operator determination and operation mode switching processing performed by the image forming apparatus 1 will be described. FIG. 6 is a flow chart showing the first embodiment of the operator determination and the operation mode switching processing described by use of FIGS. 5A to 5D above.

Before start of the processing, the image forming apparatus 1 is set in the sleep mode, and the sensor section 50 does not make oscillation operation and is located at the turning center position as a default position. In such a state, upon approach of a human to the image forming apparatus 1 and its entrance into the detection region of the sensor section 50, the sensor section 50 detects this approaching human as an object (Yes in S1).

Upon the human detection by the sensor section 50, the control section 100 starts oscillation operation of the oscillation mechanism 60, and makes the sensor section 50 perform reciprocating turning by the oscillation mechanism 60 within a predefined angle range (S2). Then the object determination section 101, by using a built-in timer or the like, starts measurement of time passage from this start of the turning operation (S3).

If, without a situation that the object 20 is not detected by the sensor section 50 before the passage of the aforementioned first period of time is measured by the aforementioned timer (No in S4, Yes in S7), a state in which the aforementioned object 20 is detected by the sensor section 50 continues until the passage of the first period of time is measured (Yes in S4), the object determination section 101 determines that the object 20 detected by the sensor section 50 exists and this object 20 is the operator (S5).

The control section 100, in response to this determination, sets the image forming apparatus 1 in the normal operation mode (S6). At this point, for example, the control section 100 drives the heater 136 in the fixing section 13 to heat a heat roller.

On the other hand, in a case where the aforementioned object 20 is not detected by the sensor section 50 before the passage of the aforementioned first period of time is measured by the aforementioned timer (No in S7), the object determination section 101 determines that the object 20 detected by the sensor section 50 does not exist and this object 20 is just a passenger (S8). At this point, the control section 100, in response to this determination, keeps the image forming apparatus 1 in a state of the sleep mode and also keeps the heater 136 in the fixing section 13 not driving.

According to this first embodiment, based on results of the detection by the sensor section 50, it is possible to accurately determine whether an object located ahead of the front of the image forming apparatus 1 is the operator performing operation of the image forming apparatus 1 while remaining still at surroundings of the image forming apparatus 1 or a passenger passing through the surroundings of the image forming apparatus 1.

Moreover, in the image forming apparatus 1, in order to immediately perform image formation operation as normal operation, the heat roller of the fixing section 13 needs to be constantly heated to a predefined high temperature. However, according to this embodiment, this heating can be limitedly performed only upon the determination by the object determination section 101 that this object 20 is the operator, thus making it possible to reduce power required for this heating.

Moreover, the control section 100, upon the determination by the object determination section 101 that the object 20 is the operator, sets the image forming apparatus 1 in the normal operation mode providing the state in which the image forming apparatus 1 can perform normal operation, and sets it in the sleep mode in other cases, thus making it possible to reduce power consumption of this image forming apparatus 1.

Moreover, as described above, capability of accurately determining whether the object located in front of the image forming apparatus 1 is the operator or the passenger can prevent a situation that the sleep mode is released upon every passage of a human body in front of the image forming apparatus 1 and can improve power-saving performance of the image forming apparatus 1.

Figures 7A, 7B:
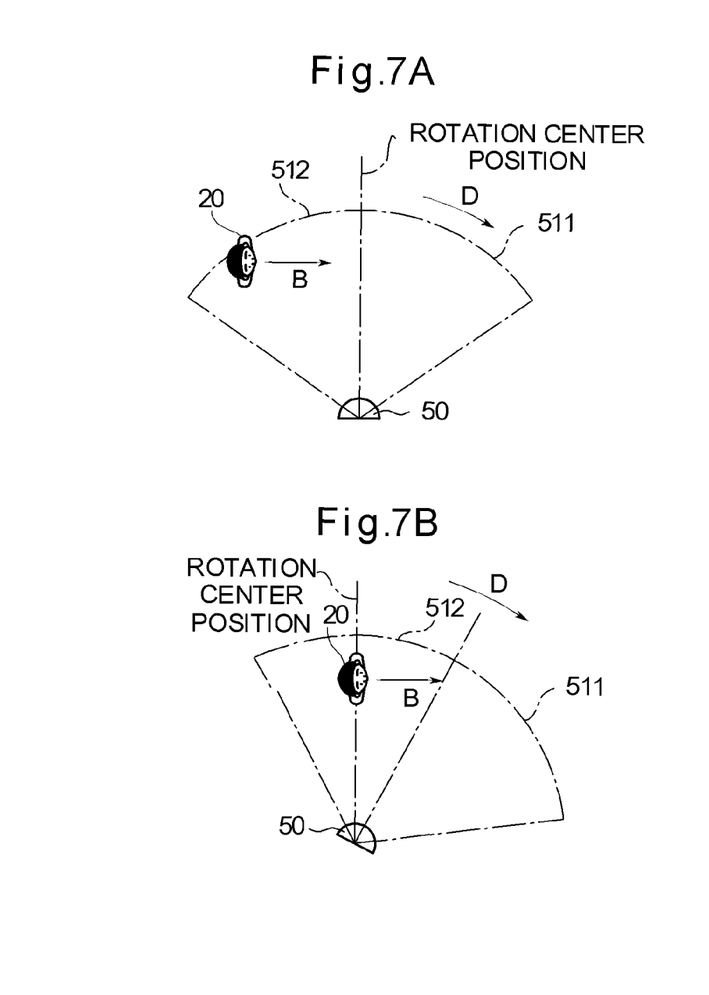
FIGS. 7A to 7D are diagrams showing how the sensor section detects the object moving ahead of the image forming apparatus according to one embodiment of this disclosure.

Next, another example of the determination by the object determination section 101 will be described. FIGS. 7A to 7D are diagrams showing how an object moving ahead of the image forming apparatus 1 is detected by the sensor section 50. FIG. 7A shows a situation when, in a state in which the sensor section 50 faces the front (is at the turning center position), the object 20 enters from the left of the image forming apparatus 1 into the detection region of the pyroelectric infrared sensor 501 and the sensor section 50 detects this object 20.

Figure 7C:
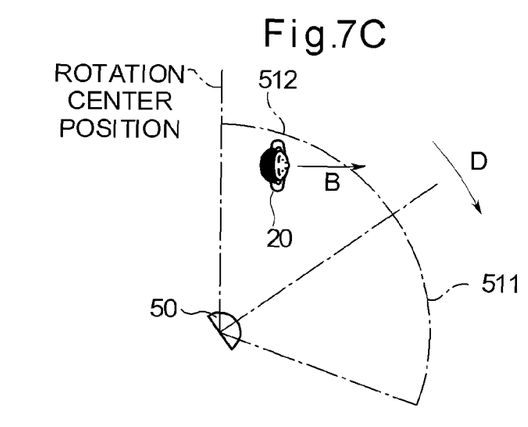

FIGS. 7B and 7C are diagrams showing positional relationship between the regions of the detection by the sensor section 50 and the object 20 when the sensor section 50 is turned by the oscillation mechanism 60 in the same direction as the moving direction of the object 20.

When the sensor section 50 is in a state of FIG. 7A, the object 20 enters into the second detection region 512 from a left direction in FIG. 7A and moves rightward (in a direction of an arrow B), upon which the sensor section 50 detects this object 20.

This object 20 continuously moves in this direction and the sensor section 50 is turned by the oscillation mechanism 60 under the control by the control section 100 in a direction of an arrow D indicated in FIG. 7A, i.e., the same direction as the moving direction of this object 20, upon which for example, a state in which the object 20 is detected by the sensor section 50 continues, as shown in FIG. 7B.

Then even if the object 20 further continues to move in the aforementioned direction and the sensor section 50 further turns in the same direction as the moving direction of this object 20, the turning of the object 20 and the sensor section 50 is directed in the same direction, and thus for example, as shown in FIG. 7C, the object 20 remains within the detection region of the sensor section 50 with higher possibility than the object 20 remaining still ahead of the front of the image forming apparatus 1 and the object 20 moving in the direction opposite to the turning direction of the sensor section 50.

Figure 7D:
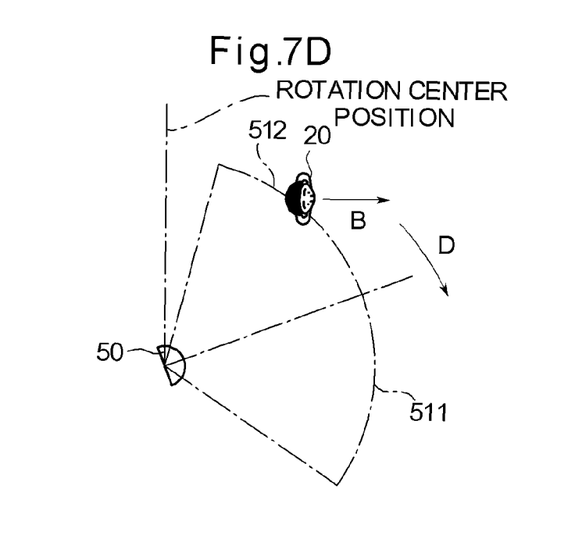

Moreover, as shown in FIG. 7D, even in a case where the object 20 further continues to move in the aforementioned direction and the sensor section 50 further turns in the same direction as the moving direction of this object 20, the turning of the object 20 and the sensor section 50 is directed in the same direction, and thus the object 20 may remain within the detection region of the sensor section 50. This is because the object 20 moving in the same direction as the turning direction of the sensor section 50 has a slower relative speed at which it moves within the detection region of the sensor section 50 than the object 20 remaining still and the object 20 moving in the direction opposite to the turning direction of the sensor section 50.

Here, FIGS. 8A to 8D show states in which the sensor section 50 detects the object 20 remaining still within the detection region of the sensor section 50 located in front of the image forming apparatus 1 at the same turning angle as each turning angle of the sensor section 50 shown in FIGS. 7A to 7D.

Figure 8A:
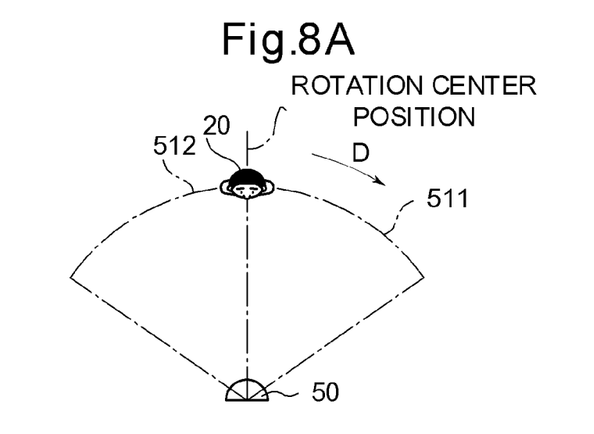
FIGS. 8A to 8D are diagrams showing how the sensor section detects the object (operator) remaining still ahead of the front of the image forming apparatus according to one embodiment of this disclosure.
Figure 8B:
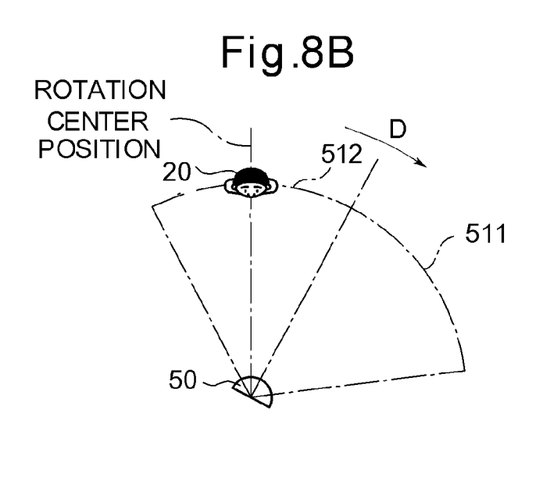
Figure 8C:
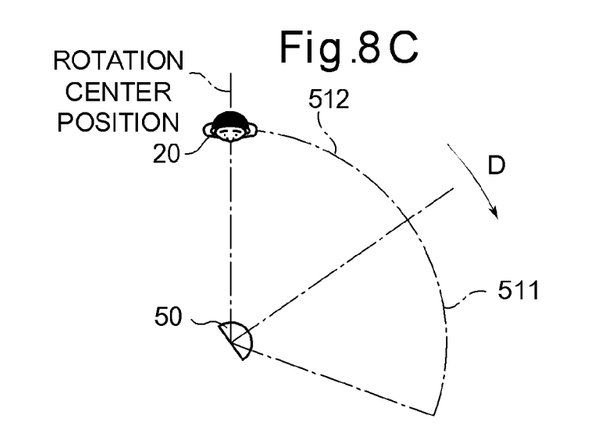
Figure 8D:
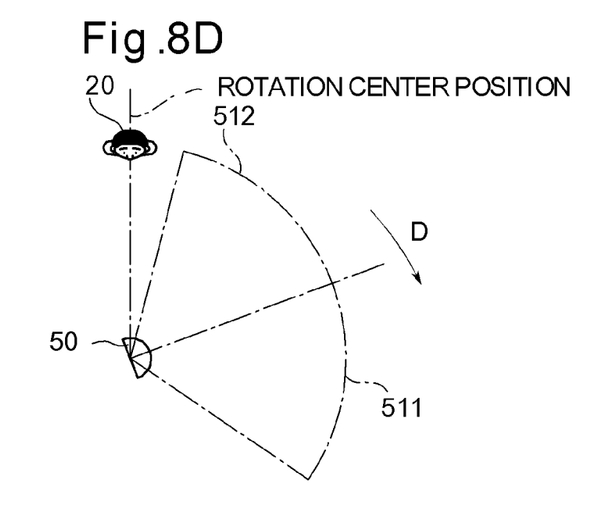

As shown in FIGS. 8A to 8C, even upon attempts of the sensor section 50 to detect the object 20 located in front of the image forming apparatus 1, the sensor section 50 at these turning angle positions is assumed to be capable of detecting this object 20 remaining still, but upon further turning from the position shown in FIG. 8C, as shown as an example in FIG. 8D, this object 20 may be out of the detection regions of the sensor section 50 with high possibility. On the contrary thereto, the object 20 moving in the same direction as the turning direction of the sensor section 50 as described above possibly remains within the detection region of the sensor section 50 (FIG. 7D).

Thus, it is assumed that the object 20 moving in the same direction as the turning direction of the sensor section 50 has longer time from when it is detected by the sensor section 50 until when the object 20 departs from the detection regions of the sensor section 50 turning in the same direction as the moving direction of this object 20 than the object 20 remaining still as described above and the object 20 moving in the direction opposite to the turning direction of the sensor section 50.

For example, the object 20 moving in the same direction as the turning direction of the sensor section 50 at the same speed as the turning speed of the sensor section 50 has the longest time until when it departs from the detection regions of the sensor section 50, but if the moving direction of the object 20 is the same as the turning direction of the sensor section 50 even when the moving speed of the object 20 is not the same as the turning speed of the sensor section 50, it is assumed that this object 20 has longer time until when it departs from the detection regions of the turning sensor section 50 than the object 20 remaining still as described above and the object 20 moving in the direction opposite to the turning direction of the sensor section 50.

As a result, after the start of the turning operation of the sensor section 50 by the control section 100, in a case where the state in which the object 20 is detected by the sensor section 50 continues for the second period of time that is longer than the first period of time, the object determination section 101 determines that this object 20 does not exist, and in a case where the state in which this object 20 is detected does not continue for this second period of time, the object determination section 101 determines that the object 20 exists, thereby making it possible to exclude any object that may be a passenger moving in the same direction as the turning direction of the sensor section 50 with high possibility and accurately detect the presence of the object 20 which remains still ahead of the front of the image forming apparatus 1 and which may be the operator of the image forming apparatus 1 with high possibility.

Typically, many of human body detecting sensors use a pyroelectric infrared sensor including a pyroelectric element that detects a human body based on an amount of an infrared ray change. In this pyroelectric infrared sensor, in a case where infrared rays generated as a result of movement of the human body is condensed at a light-receiving part of the pyroelectric element, a signal generated by polarization of the pyroelectric element in accordance with the infrared ray change is converted into a voltage signal, and this voltage signal subjected to predetermined processing is outputted as a high level as a result of comparison with a threshold value by a comparator, it is determined that the human body has been detected. Here, the pyroelectric infrared sensor uses the amount of infrared ray change for detecting whether or not a human body is present, but if the human body is detected in a sensor detection region, only basing on the detection of the amount of infrared ray change makes it difficult to discriminate whether this detection indicates the operator (approaching for use of the apparatus) or a passenger only passing in front of the apparatus. Thus, upon shift of the image forming apparatus 1 from the sleep mode to the normal operation mode by the control part of the image forming apparatus, there arise problems, for example, deterioration in power saving performance as a result of release of the sleep mode upon every passage of just the passenger that is not the operator in front of the apparatus.

On the contrary thereto, according to the aforementioned embodiment, even in a case where a pyroelectric infrared sensor is included as a human body detecting sensor in the image forming apparatus, it is possible to determine whether an object existing at surroundings of an electronic device is an operator or a passenger, and it is possible to accurately detect the presence of an object that may be an operator of the image forming apparatus with high possibility as described above.

Figure 9:
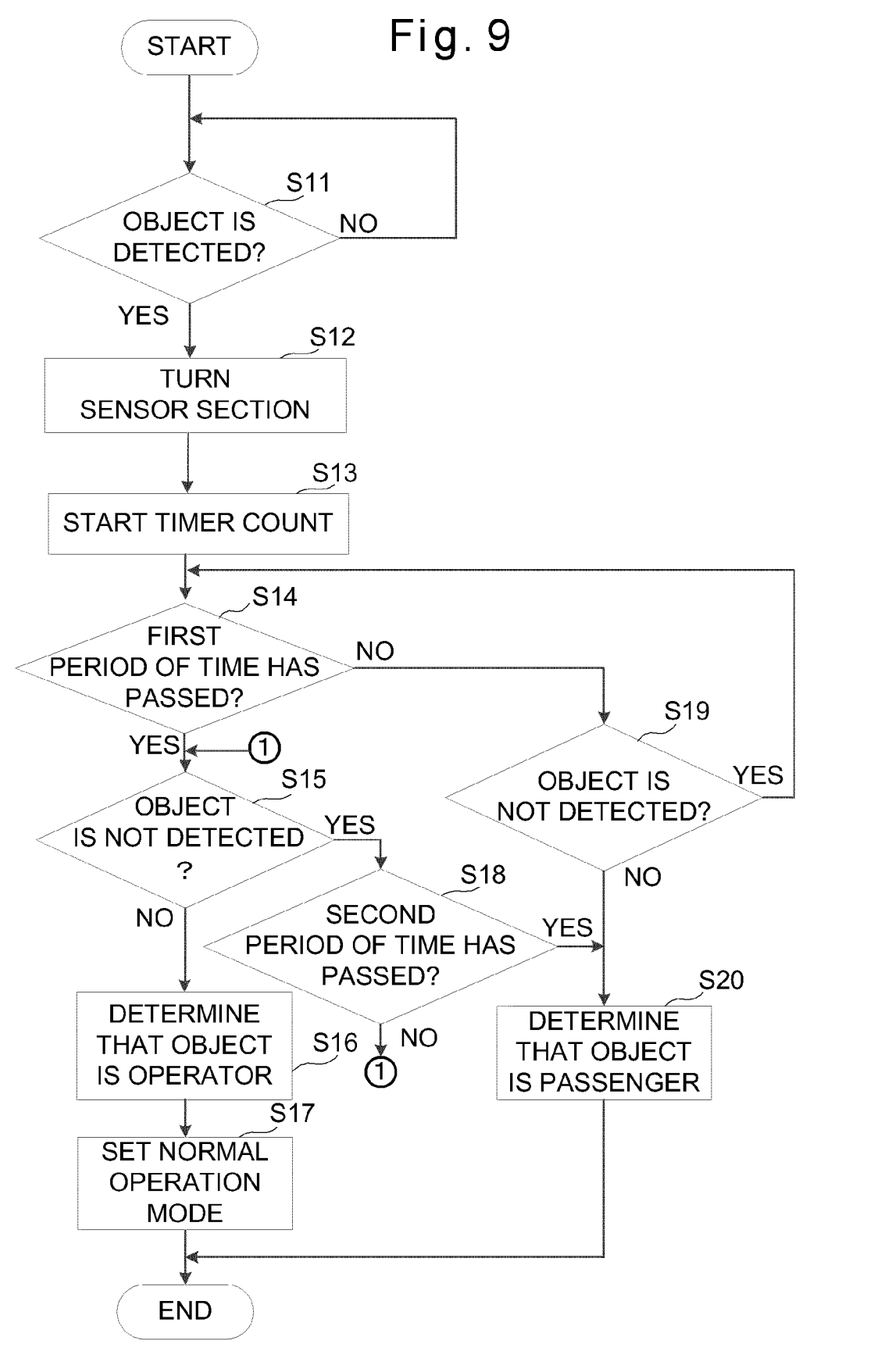
FIG. 9 is a flow chart showing a second embodiment of the operator determination and the operation mode switching processing performed by the image forming apparatus according to one embodiment of this disclosure.

Next, a second embodiment of the operator determination and the operation mode switching processing performed by the image forming apparatus 1 will be described. FIG. 9 is a flow chart showing the second embodiment of the operator determination and the operation mode switching processing described by use of FIG. 7 above. In the description of the second embodiment, description of the same processing as that of the first embodiment will be omitted.

In the second embodiment, if a state in which the sensor section 50 detects the aforementioned object 20 continues until passage of the first period of time is measured by the timer (Yes in S14), the object determination section 101, until when passage of the second period of time defined to be longer than this first period of time is measured, judges whether or not the state in which the aforementioned object 20 is detected by the sensor section 50 continues (No in S15, S18).

Here, if the object determination section 101 judges that the passage of the second period of time has been measured by the aforementioned timer (Yes in S18) while the state in which the object 20 is detected by the sensor section 50 continues (Yes in S15), the object determination section 101 determines that the object 20 detected by the sensor section 50 is just a passenger (S20).

On the other hand, before the passage of the second period of time is measured by the aforementioned timer (No in S18), in a case where the object 20 is not detected by the sensor section 50 (No in S15), the object determination section 101 determines that the object 20 detected by the sensor section 50 is the operator (S16).

According to this second embodiment, it is possible to accurately determine by the pyroelectric infrared sensor 501 whether the object located in front of the image forming apparatus 1 is the operator who remains still at surroundings of the image forming apparatus 1 and who performs operation of the image forming apparatus 1 or the passenger who passes through the surroundings of the image forming apparatus 1. That is, it is possible to, for the object 20 moving in the same direction as the turning direction of the sensor section 50, accurately discriminate from the operator, not only a passenger moving in the direction opposite to the turning direction of the sensor section 50 but also a passenger moving in the same direction as the turning direction of the sensor section 50.

Note that this disclosure is not limited to the configuration of the embodiments described above and various modifications are possible. For example, the embodiments above are described by using a compound machine as one embodiment of the electronic device according to this disclosure, but this is only one example, and any of other electronic devices, for example, another image forming apparatus such as a printer, a copier, or a facsimile is permitted.

Moreover, in the embodiments described above, the configuration and the processing shown by the aforementioned embodiments by use of FIGS. 1 through 9 are only one embodiment of this disclosure, and this disclosure is not limited to these configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic device comprising:
   a sensor section including a pyroelectric infrared sensor detecting presence of an object based on an infrared ray change;
   an oscillation mechanism configured to cause the sensor section to turn in both directions, by a predefined angle in each direction, from a predefined initial position at which a view angle of the sensor section is directed ahead of front of the electronic device;
   a control section, upon the detection of the object by the sensor section, configured to cause the oscillation mechanism to start turning operation; and
   an object determination section, after the turning operation of the sensor section by the control section starts from the initial position, determining that the object is an operator in a case where a state in which the object is detected by the sensor section continues for a predefined first period of time, and determining that the object is a passenger in a case where the state in which the object is detected does not continue for the first period of time,
   wherein the predefined initial position is a turning center position in a turning direction of the sensor section, and
   when the sensor section at the turning center position turns from the turning center position to a limited spot of the turning operation in a direction towards one side or a direction towards the other side as a result of the turning operation by the oscillation mechanism, an object located in a still state ahead of front of the turning center position is out of the detection regions of the sensor section, and
   the predefined first period of time is a period of time at which the object located in the still state ahead of front of the turning center position is assumed to be continuously detected in a case where the sensor section at the turning center position turns from the turning center position to the limited spot of the turning operation in the direction towards one side or the direction towards the other side as the result of the turning operation by the oscillation mechanism.

* * * * *